United States Patent [19]
Carroll

[11] Patent Number: 5,330,066
[45] Date of Patent: Jul. 19, 1994

[54] TWO TIER FRAME

[75] Inventor: Joseph W. Carroll, West Chester, Pa.

[73] Assignee: Kim Manufacturing Company, Downingtown, Pa.

[21] Appl. No.: 938,397

[22] Filed: Aug. 31, 1992

[51] Int. Cl.⁵ .............................................. A47B 47/00
[52] U.S. Cl. ................................... 211/189; 211/182; 211/190; 211/191; 211/202
[58] Field of Search ................ 211/182, 189, 190, 191, 211/202

[56] References Cited

U.S. PATENT DOCUMENTS

| | | |
|---|---|---|
| 3,332,374 | 7/1967 | Ferdinand et al. .................. 211/182 |
| 3,871,525 | 3/1975 | Al-Dabbagh et al. .............. 211/182 |
| 4,317,523 | 3/1982 | Konstant et al. .................... 211/182 |
| 4,390,103 | 6/1983 | Husband .............................. 211/182 |
| 4,729,484 | 3/1988 | McConnell ......................... 211/191 |
| 4,928,834 | 5/1990 | Neiman .............................. 211/191 |

*Primary Examiner*—Kurt C. Rowan
*Assistant Examiner*—Chuck Y. Mah
*Attorney, Agent, or Firm*—Eugene E. Renz, Jr.

[57] ABSTRACT

A frame device for supporting objects such as batteries and the like during seismic stress comprising two vertical frame members formed in a G shaped cross section. The frame has an inside face facing the other of the pair, a front face extending perpendicularly to an outside face. A back face extends from the inside face for part of the distance to the outside face. It also includes a top horizontal cross member formed in a C shaped cross section and having horizontally extending tab portions at each terminal end. The inside faces of horizontal members have slots passing one end of the top cross member through each inside face. The outside faces of the horizontal members have notches to receive the tabs of the top cross member to attach it to the vertical frame member. A bottom horizontal cross member is formed in a C shaped cross section, having a bottom face across the width of the top cross member with its bottom face having a slot and groove proximate each terminal end. The vertical members have tabs at the lower terminal of the faces for engaging the slot and groove on the bottom face. The bottom cross member has a top face sized to engage and space the inside faces of the vertical frame members.

12 Claims, 5 Drawing Sheets

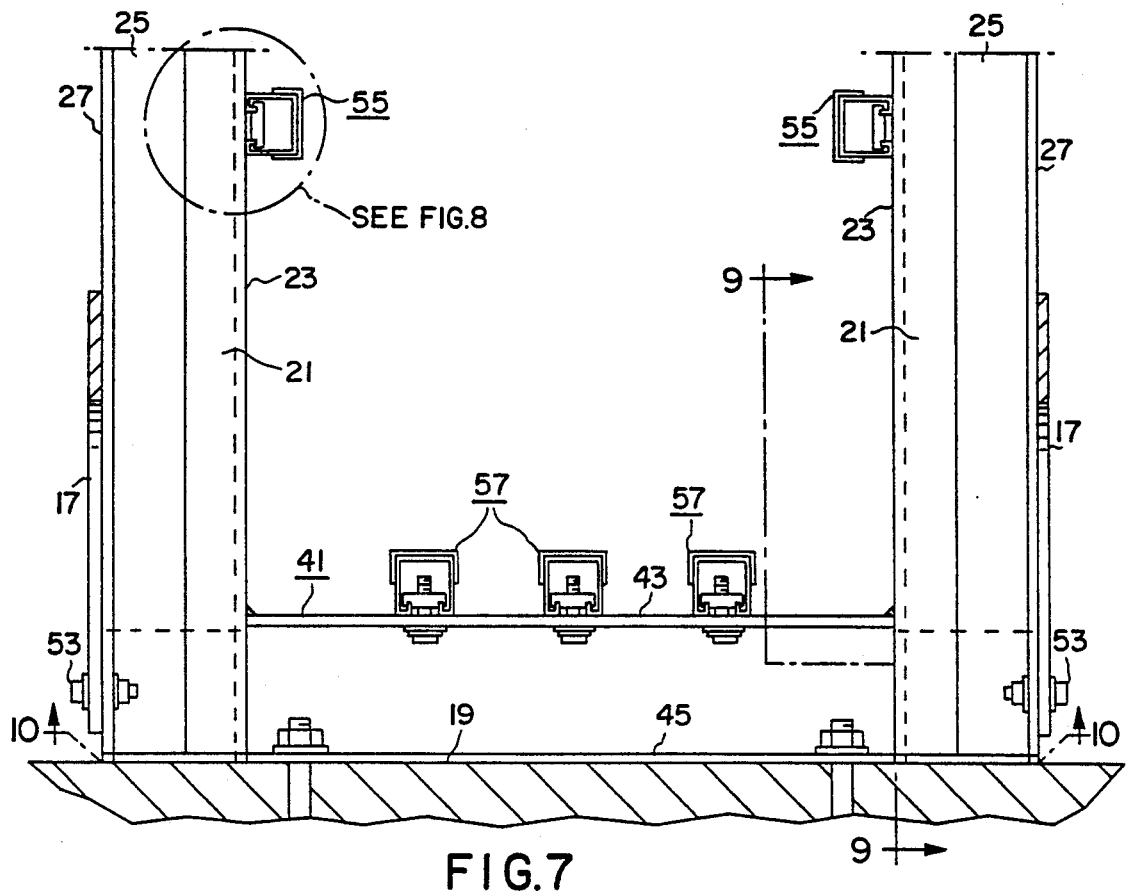
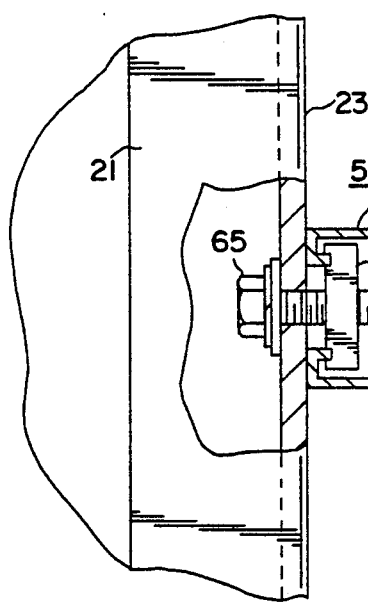
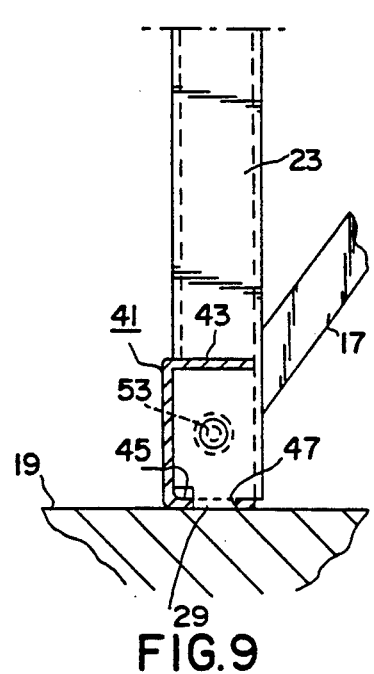
FIG.7
FIG.8
FIG.9

TWO TIER FRAME

FIELD OF THE INVENTION

The present invention relates to a frame for supporting and storing objects, and more particularly to a frame having two tiers and being capable of supporting batteries and other heavy objects while surviving seismic forces during earth tremors and the like. The invention relates specifically to frames forming part of what is known as an uninterruptable power source.

BACKGROUND OF THE INVENTION

There are many situations in industry where it is necessary to provide backup electrical power for emergency situations. In nuclear reactors, hospitals, computer and communication centers and anywhere that reserve power is needed, banks of batteries are being installed to provide that reserve power. Of course, the reserve power must be able to survive any condition which would cause the primary power to fail.

Not only are these reserve power systems intended for use when primary power sources shut down, they are intended to be able to provide power under any condition. In the industry, they are termed Uninterruptable Power Supply (UPS) systems. The fact telephone service remained intact immediately after the Oakland earthquake during the Baseball World Series several years ago is a testimonial to the existence of UPS systems. The tragedy at Chernobyl in the former Soviet Union is an example of where a UPS system failed, actually causing further injury and damage as communications and relief efforts were delayed by the lack of back up or reserve power.

Frames for UPS systems have two requirements. First, the frames must be able to support a bank of batteries, usually in a two tier configuration, without transfer of electrical power except upon demand. Second, the frames must withstand severe seismic shock such as that experienced in explosions, heavy storms such as hurricanes, and, most importantly, in earthquakes of significant magnitude.

Conventional systems for providing UPS systems has been to construct steel frames, which have appropriate insulation. These frames are intended to survive the aforementioned forces. Typical systems include two or more frames which are, perhaps, 60 inches high. Cross braces are placed between them to make a frame or rack for the heavy storage batteries. There is a need to insulate the frame to prevent discharge of the reserve power and potentially harmful currents being present.

UPS system frames have to survive substantially intense tests. One such test includes the inducement of simulated earthquake conditions. In this test, a frame is placed on a ten foot by fifteen foot table, and loaded with up to 12,000 pounds of batteries. The table is shaken at the specific G factor and frequency which simulates an earthquake of a specific magnitude, up to and including major forces of Richter scale 7 or more. Actual stress to which the frames are subjected is measured in Hz. It has been learned that subjecting frames to a natural frequency of 6 to 7 Hz will, when forces of 5 G or more are present, cause failure in conventional designs. Present day frames are unfortunately not able to pass this test, but rather collapse in a crumble of twisted steel and crashing batteries. At present, no frame device for UPS systems has passed the more critical tests of this type.

Mere selection of strong steel for the frame structure is not enough. The system is only as good as the frame and the structural steel has to perform. Prior art designs have taken square welded tube, such as 3 inch square tube, at the vertical members and have used shipping car channels welded together as cross pieces. Such a construction requires an extensive amount of welding, which is imprecise and which does not by itself provide a sufficiently rigid structure so as to eliminate harmonic resonance with the test conditions.

Many of the structures which have been proposed require considerable welding to fabricate the design. Even though these designs have not met the required criteria, they are still quite expensive to produce as they are labor intensive. Systems proposed to modify or strengthen these welded systems have not been found to improve the stability of the frames under stress. Merely, the cost is increased.

Accordingly, it is an object of this invention to provide a frame device suitable for holding a large quantity of batteries in a virtually failure proof state so as to provide an uninterruptable power supply.

Another object is to provide a frame for auxiliary power supply which is capable of eliminating harmonic resonance under greater than 5 G gravity at less than 6 to more than 7 Hz frequencies.

Still another object of the present invention is to provide a frame device which eliminates substantial welding while increasing the strength and vibration resistance of the frame.

Other objects will appear hereinafter.

SUMMARY OF THE INVENTION

It has now been discovered that the above and other objects of the present invention may be accomplished in the following manner. Specifically, the present invention provides a frame device for supporting objects such as batteries and the like during seismic stress.

Specifically, the device includes a pair of vertical frame members each formed in a G shaped cross section and having an inside face facing the other of the pair, a front face extending perpendicularly away from the inside face to an outside face parallel to and facing away from the inside face, and a back face extending perpendicularly away from the inside faces for only part of the distance to the outside face. This G shaped cross section provides a unique and effective support for the frame, enabling the frame to withstand substantial seismic forces without failure.

The frame includes a top horizontal cross member formed in a C shaped cross section and having horizontally extending tab portions at each terminal end for interaction with the inside faces of horizontal members which have slots for passing one end of the top cross member through each inside face. The outside faces of the horizontal members each have notches positioned to receive the tabs of the top cross member to fixedly attach the top cross member to the vertical frame members.

The frame also includes a bottom horizontal cross member formed in a C shaped cross section with a bottom face extending the width of the top cross member. The bottom face has a slot and a groove proximate each of its terminal ends. The vertical members each have tabs at their lower terminal ends on both the inside and outside faces for engaging the slot and groove on the bottom face. The bottom cross member has a top face sized to engage the inside faces of the vertical frame members.

In use, the device of this invention will be combined with side rails and side braces connecting at least a pair of the devices to provide a two tier frame for supporting the objects thereon. Thus formed into a two tier frame including an insulated battery support for the batteries, the frame is stable and resistant to seismic forces. Battery clamping means are provided for clamping a plurality of batteries in the two tier frame. The battery support comprises insulated side rails and mounting means for securing the side rail to the frame member, including corner brackets tying the terminal ends of the insulated side rails to an end rail.

BRIEF DESCRIPTION OF THE DRAWINGS

For a more complete understanding of the invention, reference is hereby made to the drawings, in which:

FIG. 7 is an enlarged, fragmentary transverse sectional view taken on the line 7,7 of FIG. 1.

FIG. 8 is an enlarged, fragmentary sectional view of the detail contained within the dot and dash circle of FIG. 7 and designated FIG. 8.

FIG. 9 is a stepped sectional elevational view taken along the line 9,9 of FIG. 7 showing the inter engagement of the bottom horizontal member with the vertical member of the frame.

DETAILED DESCRIPTION OF THE PREFERRED EMBODIMENT

Figure 1:
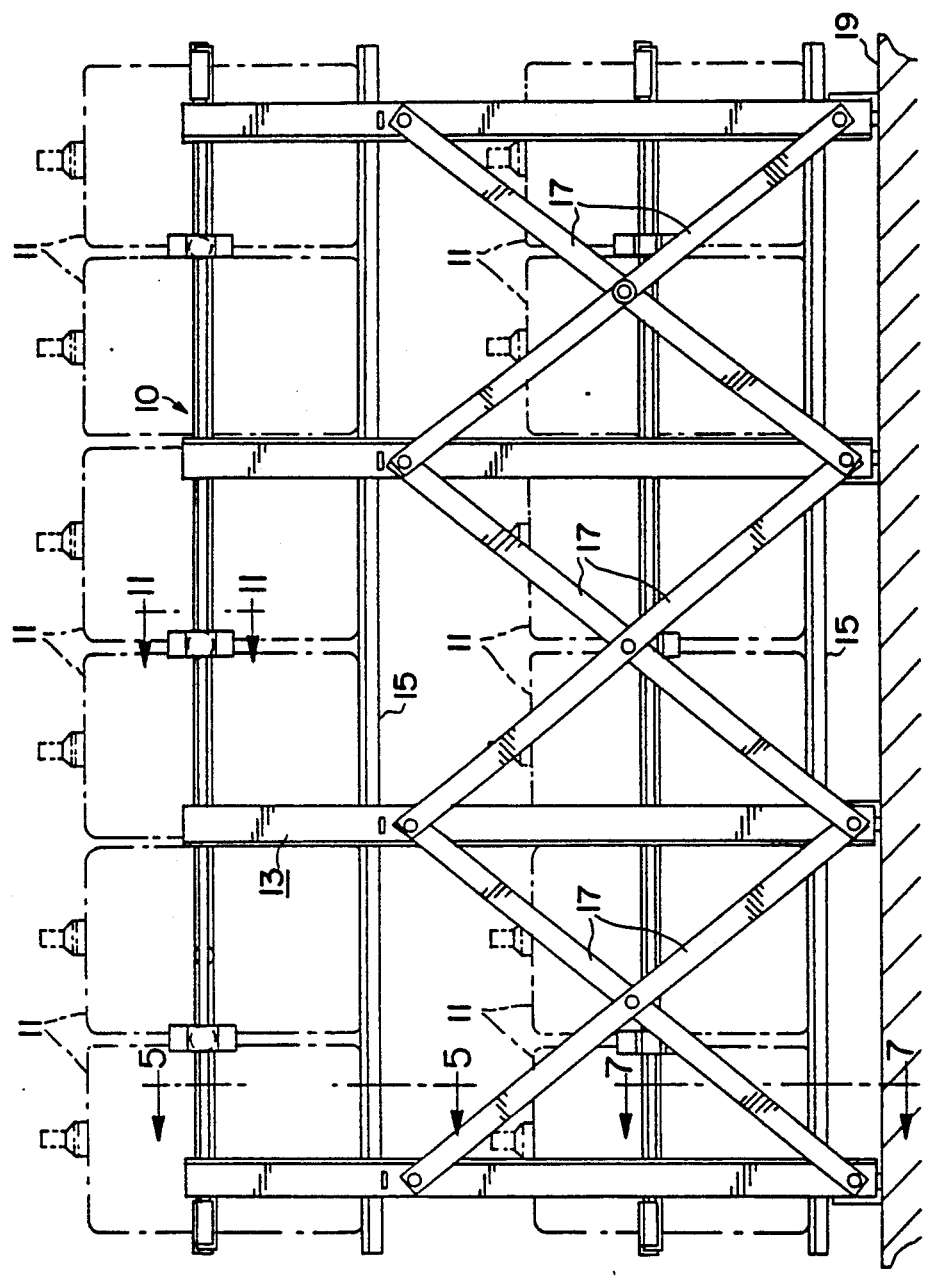
FIG. 1 is a semi-schematic side elevational view of a two tier frame, shown supporting batteries in dot and dash outline.

As shown in the drawings, a frame device generally at 10 is shown supporting a large plurality of batteries 11 in conditions of ready storage for emergency or backup use as needed.

While the particular battery is not important to the present invention, as the frame device is designed to support and protect any object placed thereon, one particular battery which is commonly used in these systems is made by Excide Corporation under the trade name Dynacel Type EMF. Model EMF-800 is leak proof, does not need ventilation, uses flame retardant PVC, and has a proven cycling capability and a 20 year life. These batteries are almost 15 inches wide and over 27 inches tall including the height of the terminal posts, and may way 600 pounds each or more. Racks are needed to hold as many as 28 batteries per rack.

Figure 2:
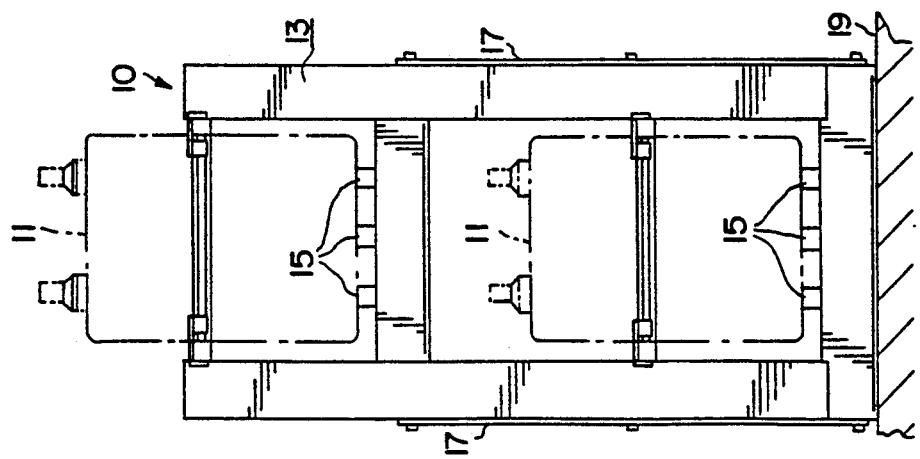
FIG. 2 is an end elevational view of the device shown in FIG. 1.

The overall frame system is shown in FIG. 1 and FIG. 2, where batteries 11 are supported on a frame 13 which includes battery support rails 15 and cross support bars 17 to maintain the stability of the flamework on the ground surface 19. The unique method of obtaining the improved stability of the present invention comes from the specific design of the racks or frames, shown in FIG. 3 prior to assembly and in FIG. 4 after the frame device has been assembled.

The device includes a pair of vertical G shaped support members having a first or back face 21 which extends from the inside face 23 of each vertical G shaped support member. Inside face 23 is facing the other inside face 23 of the other of the pair of support members. Both have a front face 25 extending perpendicularly to an outside face 27. Back face 21 extends from the inside face 23 for part of the distance to the outside face 27 and offers additional support and rigidity.

It should be noted that the vertical G shaped support members are constructed without welding, thus having stronger resistance to bending and vibration due to the right angle construction. Tabs 29 are located at the lower terminal ends of inside face 23 and outside face 27 of both vertical members.

Figure 3:
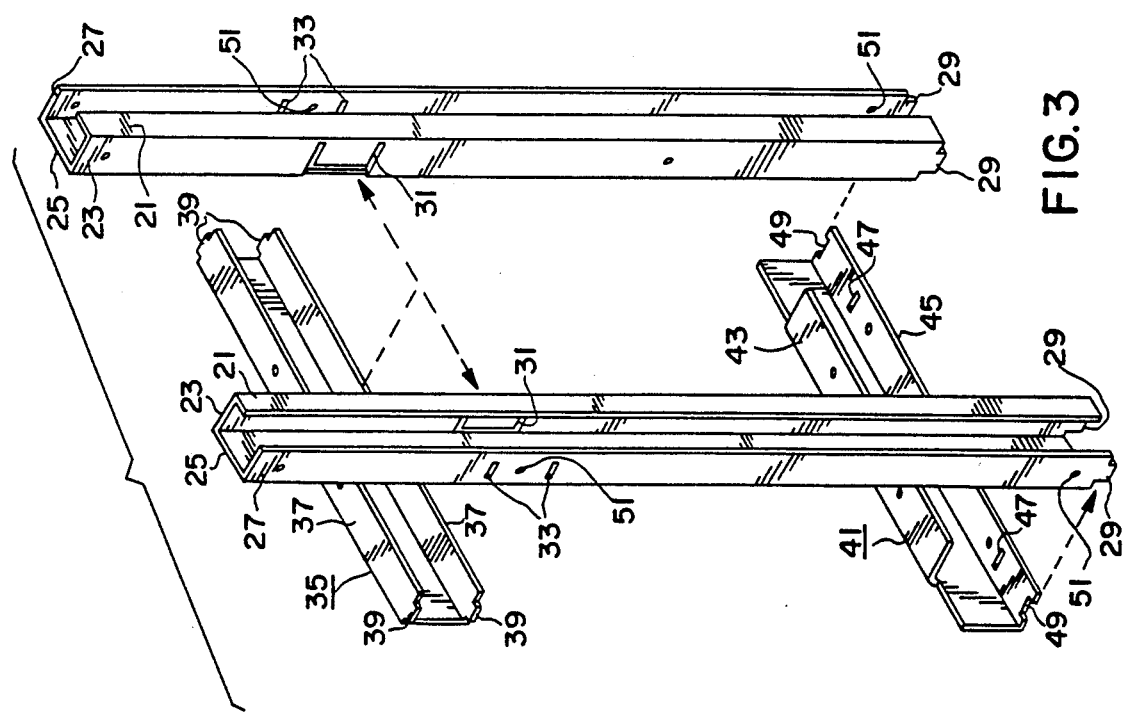
FIG. 3 is an enlarged, exploded isometric view showing the component parts of the present invention prior to assembly.

Inside face 23 also has a C shaped slot 31 which is sized to permit horizontal members to be inserted into slot 31. Outer face 27 has a plurality of slots 33 as shown in FIG. 3. Cooperatively associated with the vertical member is an upper horizontal member 35, C shaped in configuration, having top and bottom portions 37 which terminate in tabs 39. The top horizontal member 35 is inserted through C shaped slot 31 as slot 31 and member 35 are sized to cooperatively fit tightly in this alignment. Tabs 39 extend into slots 33 so that the top horizontal member 35 is inter engaged in the inside face 23 and outside face 27 of the pair of vertical members.

Figure 4:
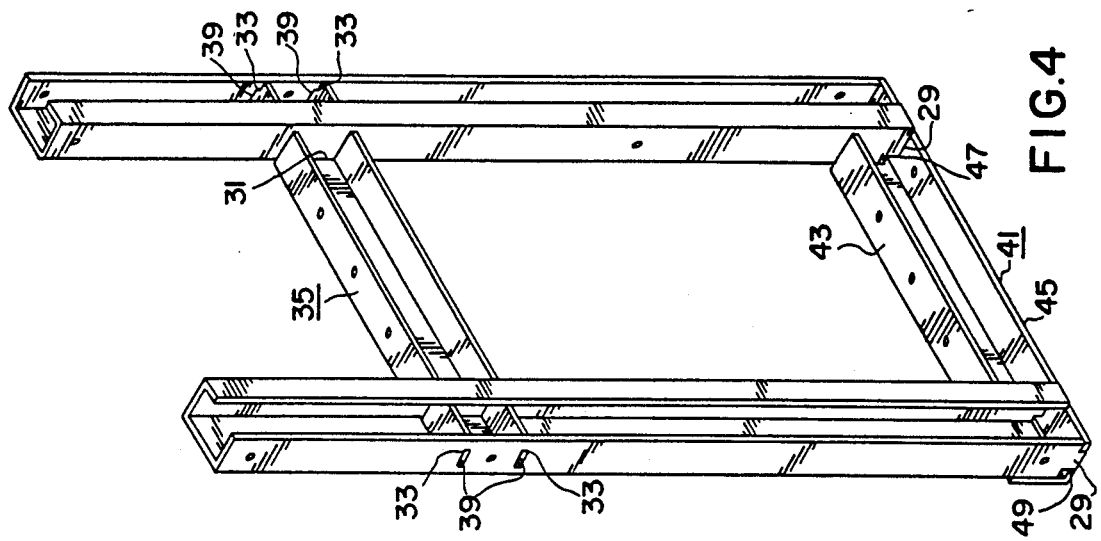
FIG. 4 is an isometric view of the assembled device shown in FIG. 3.

Also shown in FIG. 3 in an unassembled state is bottom horizontal member 41 which has a top portion 43 which will wedge between the inside faces 23 of the vertical members. Bottom portion 45 of bottom horizontal member 41 includes several slots 47 which are aligned and sized to accept end tabs 29 on inner faces 23 just as notches 49 are aligned and sized to accept end tabs 29 on outer faces 27. Once the frame has been assembled, as shown in FIG. 4, it is an easy matter to weld or otherwise secure all of the junctions to make a permanent and extremely strong frame device.

It is, of course, intended that a plurality of the above described frames can be used to provide a rack for batteries and the like which is resistant to seismic forces to a degree which has not been obtainable to this time. As shown in FIG. 2 particularly and elsewhere, cross bar supports 17 are bolted to holes 51 in all of the individual frames via bolts 53 to increase the rigidity and strength of the system.

Figure 5:
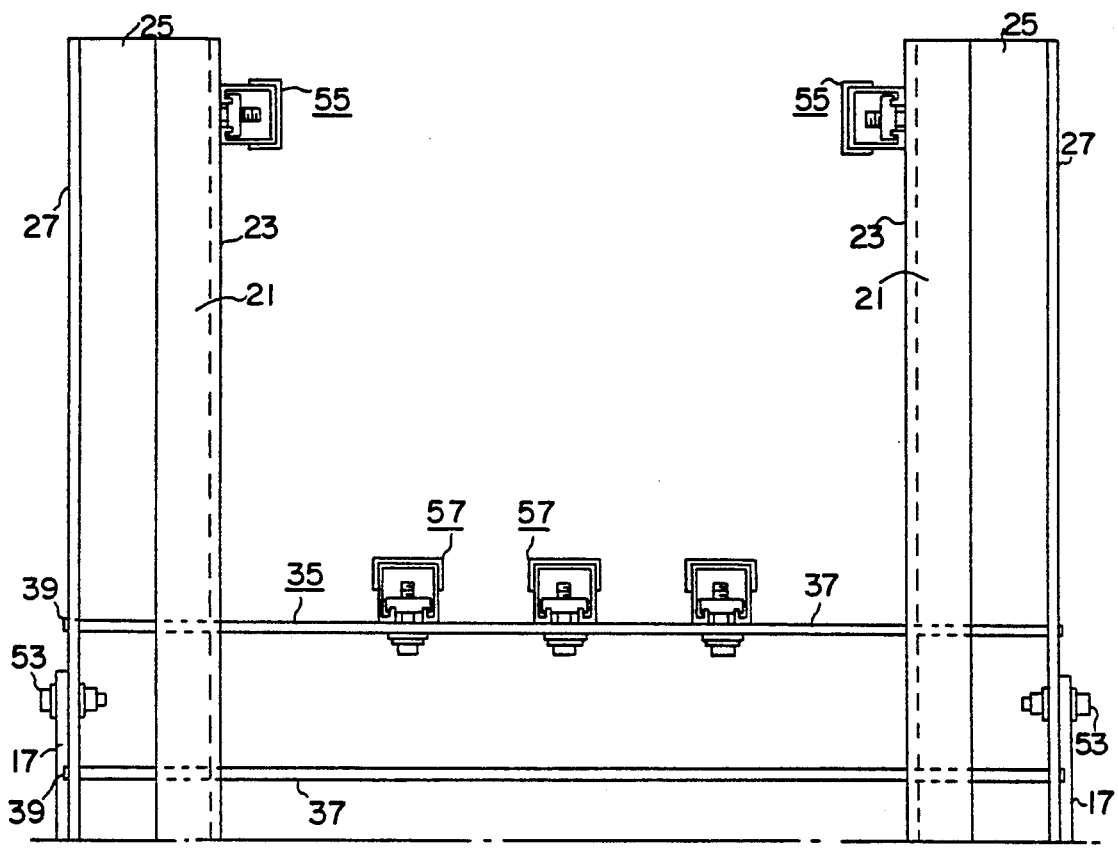
FIG. 5 is an enlarged, fragmentary transverse sectional view taken on the line 5,5 of FIG. 1.
Figure 6:
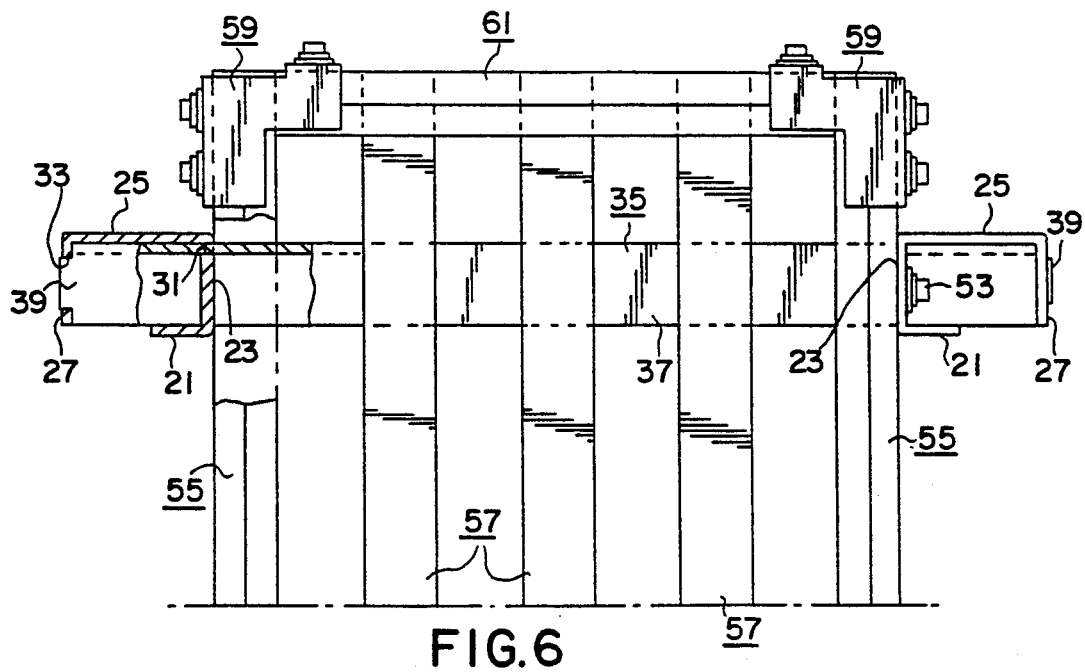
FIG. 6 is a fragmentary plan view of FIG. 5 with a portion broken away and in section to show certain features of the invention.

The system includes a series of insulated side rails 55 and insulated bottom rails 57, as shown in FIG. 5, for the batteries to be placed on and secured. Rails 55 and 57 are adjustable and are sized to tightly accommodate the desired number of batteries. As can be seen in FIGS. 5 and 6, there is an inter engagement of the upper horizontal frame 35 at its upper face 37 with vertical frame member inner face 23. Corner brackets 59 also add strength and rigidity to the system of frames as does end rail 61, shown in FIG. 6.

FIG. 7 illustrates a similar arrangement with insulated side rails 55 and insulated bottom rails 57, attached to inner faces 23 and top portions 43 of bottom horizontal member 41 respectively. FIG. 8 shows the specific details of the mounting device for a side rail 55, in which an insulated portion 63 is attached to the structural rail 55 which in turn is bolted to inside face 23 using bolt 65 which has its threaded portion 67 engage locking nut 69.

Figure 10:
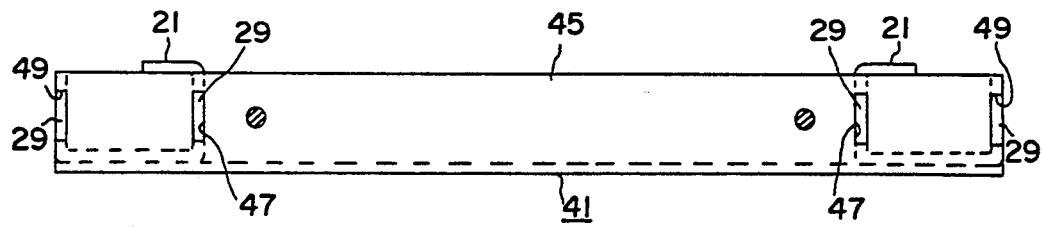
FIG. 10 is a bottom plan view of the frame taken on the line 10,10 of FIG. 7 showing tab portions of the vertically extending frame members inter engaged with the notches of the horizontally extending base frame member.
Figure 11:
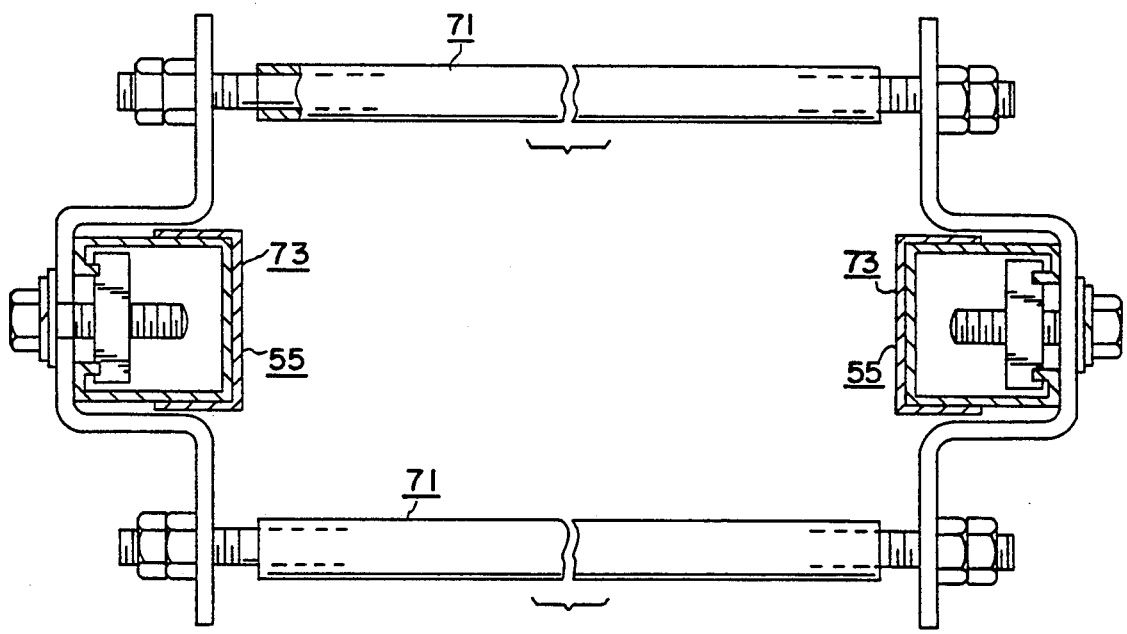
FIG. 11 is a greatly enlarged fragmentary transverse sectional view taken on the line 11,11 of FIG. 1.

FIG. 9 shows particular details of the tab 29 of outer face 27 engaging slot 47 in bottom portion 45 of C shaped bottom horizontal member 41. FIG. 10 adds a view of the back face 21 of the vertical member as it sits apart from the engagement of the horizontal and vertical members as previously described. FIG. 11 illustrates the relationship of the insulated cross supports 71 which aid in engaging the batteries. Insulated rail 73 functions as does side rail 55 described above.

In totality, the frame device and associated rails and support members provides for a two tier frame assembly which is admirably suited to support batteries and other objects under adverse conditions. The installation is highly suited for use in UPS systems as described above.

In order to demonstrate the efficacy of the present invention, a seismic simulation test was performed on a Pacific Bell Telephone battery rack system. The system was subjected to tests of single-axis resonance search testing and single-axis seismic simulation testing. The rack system of the present invention was loaded with 12 G batteries and placed on a 0.5% steel-reinforced concrete slab with a compressive strength of 3300 psi after a cure period of 28 days. The frame device was attached to the concrete slab using anchors torqued to 60 foot-pounds. The concrete slab was welded to the test table.

A Wyle Triaxial Seismic Simulator Table was used with the principal axes of the specimen frame were collinear with the axes of excitation of the test machine. A low-level (0.2 g horizontally and vertically) single-axis sine sweep from 1 to 50 Hz in each orthogonal specimen axis was performed to establish the major resonance and damping factors for the specimen. The sweep rate was one octave per minute.

Seismic simulation tests were completed by subjecting the system to 30-second duration single-axis time history motion signatures. The motion in each orthogonal axis was controlled by adjusting the gains of the synthesizer oscillators at all one-third octave frequencies over the frequency range of 1 to 60 Hz under the test response spectra envelope. During these tests, it was demonstrated that the frame possessed sufficient integrity to withstand, without compromise of structure, the prescribed seismic environment. This was considered to be the ultimate test since it was developed for use in earthquake prone regions of California. It is, to date, the only frame system to successfully pass this series of tests.

While particular embodiments of the present invention have been illustrated and described, it is not intended to limit the invention, except as defined by the following claims.

What is claimed is:

1. A frame device for supporting objects such as batteries during seismic stress, comprising:

a pair of vertical frame members each formed in a G shaped cross section and having an inside face facing the other of the pair, a front face extending perpendicularly away from said inside face to an outside face parallel to and facing away from said inside face, and a back face extending perpendicularly away from said inside faces for only part of the distance to said outside face;

a top horizontal cross member formed in a C shaped cross section and having horizontally extending tab portions at each terminal end;

said inside faces of said vertical frame members each having slots for passing one end of said top cross member through each inside face and said outside faces of said vertical frame members each having slots positioned to receive said tab portions of said top cross member to fixedly attach said top cross member to said vertical frame members;

a bottom horizontal cross member formed in a C shaped cross section and having a bottom face extending the width of said top cross member, said bottom face having a slot and a notch proximate each terminal end, said vertical members each having tabs at the lower terminal of the inside and outside faces for engaging said slot and notch on said bottom face, said bottom cross member having a top face sized to engage said inside faces of said vertical frame members.

2. The device of claim 1, which further includes side rails and side braces connecting at least a pair of said devices to provide a two tier frame for supporting said objects thereon.

3. The device of claim 2 formed into a two tier frame including an insulated battery support for said batteries.

4. The device of claim 3, which further includes battery clamping means for clamping a plurality of batteries in said two tier frame.

5. The device of claim 3, wherein said battery support comprises insulated side rails and mounting means for securing the side rail to the frame member, including corner brackets tying the terminal ends of the insulated side rails to an end rail.

6. A frame device for supporting objects such as batteries between pairs of said frame devices during seismic stress, comprising:

a pair of vertical frame members having an inside face, a front face and an outside face;

a top horizontal cross member having means for fixedly attaching said top cross member through said inside face and to said outside face of said vertical members; and a bottom horizontal cross member having means for fixedly attaching said bottom cross member to the lower terminal ends of said vertical members, said bottom cross member further including a top portion for spacing said vertical members;

said bottom horizontal cross member being formed in a C shaped cross section having a bottom face extending the width of said top cross member, said bottom face having a slot and a notch proximate each terminal end, said vertical members each having tabs at the lower terminal edges of the inside and outside faces for engaging said slot and notch on said bottom face, said bottom cross member having a top face sized to engage said inside faces of said vertical frame members.

7. The device of claim 6, wherein said vertical frame members are each formed in a G shaped cross section having an inside face facing the other of the pair, a front face extending perpendicularly away from said inside face to an outside face parallel to and facing away from said inside face, and a back face extending perpendicularly away from said inside faces for only part of the distance to said outside face.

8. The device of claim 6, wherein said top horizontal cross member is formed in a C shaped cross section having horizontally extending tab portions at each terminal end.

9. The device of claim 8, wherein said inside faces of said vertical frame members each have slots for passing one end of said top cross member through each inside face and said outside faces of said vertical frame members each having slots positioned to receive said tab portions of said top cross member to fixedly attach said top cross member to said vertical frame members.

10. The device of claim 6, which further includes side rails and side braces connecting at least a pair of said devices to provide a frame for supporting said objects thereon.

11. A frame device for supporting objects such as batteries during seismic stress comprising:
   a pair of vertical frame members having confronting generally parallel spaced flanges and a rear wall connecting the flanges;
   a top horizontal cross member having opposite ends engaging through openings in the inside of the inner flange of said vertical members; and
   means securing the horizontal cross member to the inner and outer faces of said vertical members;
   a second cross member vertically spaced from said first cross member having means for attaching to the lower terminal ends of said vertical members and including a top portion for spacing said vertical members;
   said first and second cross members having interengaging locking means.

12. A frame device for supporting objects such as batteries between pairs of said frame during seismic stress, comprising:
   a pair of vertical frame members having an inside face, a front face and an outside face;
   a top horizontal cross member having means for fixedly attaching said top cross member through said inside face and to said outside face of said vertical members;
   a bottom horizontal cross member having means for fixedly attaching said bottom cross member to the lower terminal ends of said vertical members, said bottom cross member further including a top portion for spacing said vertical members;
   said bottom cross member being of a predetermined cross section having a bottom face extending the width of said top cross member, said bottom face and vertical members having interengaging locking means and a top face sized to engage said inside faces of said vertical frame members.

* * * * *